(12) United States Patent
Odell et al.

(10) Patent No.: US 7,632,546 B2
(45) Date of Patent: *Dec. 15, 2009

(54) RADIATION CURABLE PHASE CHANGE INKS CONTAINING GELLANTS

(75) Inventors: Peter G Odell, Mississauga (CA); C Geoffrey Allen, Waterdown (CA); Christopher A Wagner, Toronto (CA); Stephan V Drappel, Toronto (CA); Rina Carlini, Mississauga (CA); Eniko Toma, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 492 days.

This patent is subject to a terminal disclaimer.

(21) Appl. No.: 11/289,609

(22) Filed: Nov. 30, 2005

(65) Prior Publication Data

US 2007/0120924 A1    May 31, 2007

(51) Int. Cl.
*B05D 1/32* (2006.01)
*C09D 11/02* (2006.01)

(52) U.S. Cl. .................. 427/466; 522/75; 522/83; 522/103; 522/109; 523/160

(58) Field of Classification Search .............. 427/466; 523/160; 522/103, 142, 75, 83, 109
See application file for complete search history.

(56) References Cited

U.S. PATENT DOCUMENTS

| 5,059,266 | A * | 10/1991 | Yamane et al. ............. 156/64 |
| 5,389,958 | A | 2/1995 | Bui et al. |
| 5,804,671 | A | 9/1998 | Dones et al. |
| 5,889,076 | A | 3/1999 | Dones et al. |
| 5,892,116 | A | 4/1999 | Weiss et al. |
| 6,239,189 | B1 | 5/2001 | Narayan et al. |
| 6,316,517 | B1 | 11/2001 | Dones et al. |
| 6,376,611 | B1 * | 4/2002 | Matzinger ............. 525/221 |
| 6,492,458 | B1 * | 12/2002 | Pavlin .................. 524/607 |
| 6,536,889 | B1 | 3/2003 | Biegelsen et al. |
| 6,547,380 | B2 | 4/2003 | Smith et al. |
| 6,561,640 | B1 | 5/2003 | Young |
| 6,586,492 | B1 | 7/2003 | Caiger et al. |
| 7,259,275 | B2 * | 8/2007 | Belelie et al. ............ 560/169 |
| 7,270,408 | B2 * | 9/2007 | Odell et al. ............... 347/102 |
| 7,271,284 | B2 * | 9/2007 | Toma et al. ............... 560/169 |
| 7,531,582 | B2 * | 5/2009 | Toma et al. ............... 523/160 |
| 2003/0036587 | A1 | 2/2003 | Kozak |
| 2006/0158491 | A1 * | 7/2006 | Belelie et al. ............. 347/96 |
| 2006/0158492 | A1 * | 7/2006 | Odell et al. ............... 347/96 |
| 2007/0120921 | A1 * | 5/2007 | Carlini et al. ............. 347/100 |
| 2007/0142492 | A1 * | 6/2007 | Odell et al. ............... 522/74 |
| 2008/0122914 | A1 * | 5/2008 | Toma et al. ............... 347/100 |

FOREIGN PATENT DOCUMENTS

WO    WO 97/24364    7/1997

* cited by examiner

*Primary Examiner*—Susan W Berman
(74) *Attorney, Agent, or Firm*—Oliff & Berridge, PLC

(57) ABSTRACT

A radiation curable phase change ink preferably used in piezoelectric ink jet devices includes an ink vehicle that includes at least one gellant comprised of a curable polyamide-epoxy acrylate component and a polyamide component, and at least one colorant. The use of the gellant enables the ink to form a gel state having a viscosity of at least $10^3$ mPa·s at very low temperatures of about 25° C. to about 100° C. The ink may thus be jetted at very low jetting temperatures of, for example, about 40° C. to about 110° C. The ink may be used to form an image by heating the ink to a first temperature at which the ink may be jetted, jetting onto a member or substrate maintained at a second temperature at which the ink forms a gel state, and exposing the ink to radiation energy to polymerize curable components of the ink.

20 Claims, No Drawings

RADIATION CURABLE PHASE CHANGE INKS CONTAINING GELLANTS

BACKGROUND

Described herein are radiation curable phase change ink compositions ideally suited for use in ink jet ink printing devices. In embodiments, the ink includes a curable gellant additive along with a colorant. The ink vehicle may also contain additional curable components, and may also contain an initiator for curing upon exposure to radiation.

The volume of digital color printing is expected to experience significant growth in the coming years. The color images provided by ink jet printing inks are overwhelmingly preferred in panel studies over other digital imaging systems. There is also a strong case to be made that the total cost of ownership of an ink jet printer will ultimately be cheaper than similar volume electrophotography units.

Ink jetting devices are known in the art, and thus extensive description of such devices is not required herein. As described in U.S. Pat. No. 6,547,380, incorporated herein by reference, ink jet printing systems are generally of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. There are three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device, the image is applied by jetting appropriately colored inks during four to eighteen rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot melt inks typically used with ink jet printers have a wax based ink vehicle, e.g., a crystalline wax. Such solid ink jet inks provide vivid color images. In typically systems, these crystalline wax inks partially cool on an intermediate transfer member and are then pressed into the image receiving medium such as paper. Transfuse spreads the image droplet, providing a richer color and lower pile height. The low flow of the solid ink also prevents show through on the paper.

In these systems, the crystalline wax inks are jetted onto a transfer member, for example, an aluminum drum, at temperatures of approximately 130-140° C. The wax based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium, e.g., paper, the image comprised of wax based ink is pressed into the paper.

However, the use of crystalline waxes places limitations on the printing process. First, the printhead must be kept at about 130° C. during the print process. Moreover, when the printhead is cooled and re-warmed, the resulting contraction and expansion of the ink requires a purge cycle to achieve optimum printhead performance. Furthermore, increased mechanical robustness is desired.

Recently, Xerox has discovered several radiation curable inks that may be jetted at much lower temperatures and that achieve robust images following curing. Reference is made to the following patent properties, each of which is incorporated herein by reference in its entirety. (1) Co-pending application Ser. No. 11/034,850 entitled "Low Level Cure Transfuse Assist for Printing with Radiation Curable Ink"; (2) Co-pending application Ser. No. 11/034,856 entitled "Ink Jet Ink Curable Via Different Polymerization Routes"; and (3) Co-pending application Ser. No. 11/034,714 entitled "Ink Jet Ink of Functionalized Waxes". U.S. Pat. Nos. 6,561,640 and 6,536,889, each incorporated herein by reference in its entirety, describe processes of forming ink jetted images using UV curable inks.

U.S. Pat. Nos. 5,804,671, 5,889,076, 6,239,189 and 6,316,517, as well as U.S. Publication No. 2003/0036587, each disclose compositions including rheology modifying agents therein. U.S. Pat. No. 5,804,671 and U.S. Pat. No. 5,889,076 describe a composition that is useful in the preparation of radiation curable coatings and comprising the reaction product of an epoxy component and an acid component comprised of an ethylenically unsaturated carboxylic acid or reactive derivative thereof, reacted in the presence of, or post-reaction blended with, a polyamide based on a polymerized fatty acid and having a number average molecular weight of less than about 10,000 g/mole. U.S. Pat. No. 6,239,189 describes a radiation-polymerizable composition that may be including in a printing ink, the composition containing at least one curable acrylate resin oligomer prepared by reacting an alkoxylated polyol with a first acid component which includes an ethylenically unsaturated carboxylic acid, and a rheology modifier prepared by reacting a diepoxide with a second acid component which includes an ethylenically unsaturated carboxylic acid or reactive derivative thereof in the presence of a polyamide based on a polymerized fatty acid. Ink jet inks and/or phase change inks are not described, and in fact it is believed that the viscosities of the inks described in this reference would be so large that such inks could not be jetted. U.S. Pat. No. 6,316,517 describes radiation-polymerizable compositions that are especially useful as or in a flush vehicle for making flushed pigments. The compositions contain at least one radiation-curable acrylated resin component and a copolymerizable rheology modifier component. In particular, the flushed pigment comprises a pigment and a flushing vehicle, the flushing vehicle comprising a substantially homogenous admixture of two or more curable acrylated resins selected from the group consisting of acrylated epoxies, acrylated urethanes and acrylated polyesters, and a rheology modifying resin copolymerizable with curable acrylate resin when subjected to radiation in the presence of a photoinitiator, for example the reaction product of (i) an epoxy component, (ii) an ethylenically unsaturated carboxylic acid or reactive derivative thereof and (iii) a fatty acid or reactive derivative thereof, said components (i), (ii) and (iii) being reacted in the presence of a polyamide based on a polymerized fatty acid. U.S. Publication No. 2003/0036587 describes a rheology controlled epoxy composition capable for use in bonding a silicon substrate to a flex circuit or a flex circuit to a pen body, comprising: (a) an epoxy resin component; (b) a rheology control agent selected from the group consisting of epoxysilanes, aminosilanes, trialkoxysilyl isocyanurate derivatives, and combinations thereof; (c) a curing agent component comprising a member selected from the group consisting of amine compounds, amide compounds, imidazole compounds, and combinations thereof; and (d) optionally, an inorganic filler component.

U.S. Pat. No. 6,586,492 describes an ink-jet ink comprising an ink jet vehicle and a colorant, the vehicle comprising at least 35% by weight, based on the total vehicle weight, of a radiation curable material and further comprising a thickener, said vehicle being a thixotropic paste at 20° C., and said vehicle having a viscosity of less than 25 centipoise at least at one temperature in the range of from 40° C. to 130° C.

U.S. Pat. No. 5,892,116 and PCT Patent Publication WO 97/24364, the disclosures of each of which are totally incorporated herein by reference, disclose gellants that gel a variety of nonpolar and polar liquids. Moreover, gelation of various monomers with subsequent polymerization of the gelled monomers forms organic zeolites and membrane materials.

While known compositions and processes are suitable for their intended purposes, a need remains for improvements in radiation curable inks, for example with respect to jetting temperatures, fusing latitude and image quality.

SUMMARY

These and other improvements are accomplished by the radiation curable phase change inks described herein, and processes of forming images with such inks.

In embodiments, the radiation curable phase change ink is comprised of a curable gellant comprised of a curable polyamide-epoxy acrylate component and a polyamide component, and at least one colorant. The ink may also include an initiator, and also preferably includes additional curable monomers, oligomers or polymers in the ink vehicle.

That is, in embodiments, the radiation curable phase change ink, preferably used in piezoelectric ink jet devices, includes an ink vehicle that includes at least one curable monomer, oligomer or polymer component, at least one curable gellant comprised of a curable polyamide-epoxy acrylate component and a polyamide component, at least one photoinitiator, and at least one colorant. The use of the gellant enables the ink to form a gel state having a viscosity of at least $10^3$ mPa·s at very low temperatures of about 25° C. to about 100° C. The ink may thus be jetted, for example onto an intermediate transfer member surface or directly to paper, at low jetting temperatures of, for example, about 40° C. to about 110° C.

In embodiments of forming an image with the ink, the ink is heated to a first temperature at which the ink is able to be jetted, then jetted onto paper or other media, such as boxboard, cardboard, plastic, metal or fabric, maintained at a second temperature at which the ink forms a gel state, and subsequently exposed to radiation energy to initiate the curing of curable components of the ink. The inks preferably form a gel state upon the media surface, the ink viscosity in the gel state increasing at least about $10^{2.5}$ times the viscosity of the ink at the jetting temperature.

In other embodiments of forming an image with the ink, the ink is heated to a first temperature at which the ink is able to be jetted, then jetted onto an intermediate transfer member surface maintained at a second temperature at which the ink forms a gel state, subsequently transferred from the intermediate transfer member surface to an image receiving substrate, and exposed to radiation energy to cure the curable components of the ink. The inks preferably form a gel state upon the intermediate transfer member surface, the ink viscosity in the gel state increasing at least about $10^{2.5}$ times the viscosity of the ink at the jetting temperature.

DETAILED DESCRIPTION OF EMBODIMENTS

Curable as used herein means polymerizable, i.e., a material that may be cured via polymerization, including for example free radical routes, and/or in which polymerization is photoinitiated though use of a radiation sensitive photoinitiator.

Radiation curable as used herein is intended to cover all forms of curing upon exposure to a radiation source, including light and heat sources and including in the presence or absence of initiators. Example radiation curing routes include, but are not limited to, curing using ultraviolet (UV) light, for example having a wavelength of 200-400 nm or more rarely visible light, preferably in the presence of photoinitiators and/or sensitizers, curing using e-beam radiation, preferably in the absence of photoinitiators, curing using thermal curing, in the presence or absence of high temperature thermal initiators (and which are preferably largely inactive at the jetting temperature), and appropriate combinations thereof.

The organic gellant functions to dramatically increase the viscosity of the ink within a desired temperature range. In particular, the gellant forms a semi-solid gel in the ink vehicle at temperatures below the specific temperature at which the ink is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent interactions such as hydrogen bonding, Van der Waals interactions, aromatic non-bonding interactions, ionic or coordination bonding, London dispersion forces, and the like, which upon stimulation by physical forces such as temperature and mechanical agitation or chemical forces such as pH or ionic strength, can reversibly transition from liquid to semi-solid state at the macroscopic level. The inks exhibit a thermally reversible transition between the semi-solid gel state and the liquid state when the temperature is varied above or below the gel point of the ink. This reversible cycle of transitioning between semi-solid gel phase and liquid phase can be repeated many times in the ink formulation.

The radiation curable phase change inks in embodiments may be liquid or solid at room temperature. It is desired for the radiation curable phase change inks to have a viscosity of less than about 50 mPa·s, preferably less than about 30 mPa·s, for example from about 3 to about 30 mPa·s, more preferably from about 5 to about 20 mPa·s, most preferably from about 8 to about 15 mPa·s, at the temperature of jetting. In preferred embodiments, the inks are jetted at low temperatures, in particular at temperatures below 110° C., for example about 40° C. to about 110° C., preferably about 50° C. to about 110° C., more preferably about 60° C. to about 90° C., although the jetting temperature can be outside this range.

At such low jetting temperatures, the conventional use of temperature differential between the jetted ink and the substrate upon which the ink is jetted in order to effect a rapid phase change in the ink (i.e., from liquid to solid) may not be effective. The gellant can thus be used to affect a rapid viscosity increase in the jetted ink upon the substrate. In particular, jetted ink droplets would be pinned into position on a receiving substrate such as an image receiving medium (e.g., paper) or an intermediate transfer member (e.g., a transfuse drum or belt) that is at a temperature cooler than the ink jetting temperature of the ink through the action of a phase change transition in which the ink undergoes a significant viscosity change from a liquid state to a gel state (or semi-solid state).

In embodiments, the temperature at which the ink forms the gel state is any temperature below the jetting temperature of the ink, for example any temperature that is about 5° C. or more below the jetting temperature of the ink. In embodiments, the gel state may be preferably formed at temperatures from about 25° C. to about 100° C., preferably from about 30° C. to about 70° C., more preferably from about 30° C. to about 50° C., although the temperature can be outside this range. There is a rapid and large increase in ink viscosity upon cooling from the jetting temperature at which the ink is in a liquid state, to the gel temperature, at which the ink is in the gel state. The viscosity increase is preferably at least a $10^{2.5}$-fold increase in viscosity.

It has been found that optimum transfer efficiency from an intermediate transfer surface and optimum print quality may be achieved if the viscosity of the ink image deposited on the drum is greatly increased after jetting the ink, so as to obtain a stable and transferable image that won't smear. A suitable gelling agent for the ink would gel the monomers/oligomers in the ink vehicle quickly and reversibly, and demonstrate a narrow phase-change transition, for example within a temperature range of about 30° C. to about 100° C., preferably of about 30° C. to about 70° C., although the transition range may also be outside of these temperature ranges. The gel state of the ink should also preferably exhibit a minimum of $10^{2.5}$ mPa·s, more preferably $10^3$ mPa·s, increase in viscosity at preferred transferring temperatures, e.g., from about 30 to about 70° C., compared to the viscosity at the jetting temperature. Of particular preference are gellant containing inks that rapidly increase in viscosity within 5° C. to 10° C. below the jetting temperature and ultimately reach a viscosity above $10^4$ times the jetting viscosity, and most preferably about $10^5$ times the jetting temperature. In direct to paper applications, increases in viscosity greater than $10^6$, while providing minimal show through or feathering of the image, tend to have insufficient drop spread and may preserve undesirable artifacts of jetting, such as drop structure. In intermediate transfer architectures, the ink image can be spread and smoothed by external pressure allowing much higher increases in viscosity by the gellant containing ink. However, curing such a high viscosity ink of greater than $10^7$ mPa·s is difficult to do efficiently without reheating the ink because of the limited mobility of the free radical reactants. Further, in embodiments that employ intermediate transfer of the image, the gel ink preferably also has good elastic properties to enable complete transfer from the drum, a property which can be inferred from the value of the elastic modulus (G' max) at the transfuse temperature.

When the inks are in the gel state, the viscosity of the ink is at least about 1,000 mPa·s, preferably at least about 10,000 mPa·s, more preferably at least about 100,000 mPa·s. Preferred viscosity values in the gel state are in the range of from about $10^3$ to about $10^9$ mPa·s, and most preferably from about $10^{4.5}$ to about $10^{6.5}$ mPa·s, although the gel state viscosity can be outside of these ranges. The preferred gel phase viscosity can vary with the print process. For example, the highest viscosities are preferred when employing intermediate transfer, or when jetting directly to porous paper in order to minimize the effects of ink bleed and feathering. On the other hand, less porous substrates such as plastic may require lower viscosities that control dot gain and agglomeration of individual ink pixels. The gel viscosity can be controlled by ink formulation and substrate temperature. An additional benefit of the gel state for radiation curable inks is that higher viscosities of about $10^3$-$10^4$ mPa·s can reduce oxygen diffusion in the ink, which in turn leads to a faster rate of cure in free radical initiation.

In embodiments, the gellant is comprised of a curable polyamide-epoxy acrylate component and a polyamide component.

The curable polyamide-epoxy acrylate is curable by virtue of including at least one functional group therein. Preferably, the polyamide-epoxy acrylate is difunctional. The functional group(s), preferably the acrylate group(s), are radiation curable via free-radical initiation and enable chemical bonding of the gellant to the cured ink vehicle. A commercially available polyamide-epoxy acrylate is PHOTOMER® RM370 from Cognis. The curable polyamide-epoxy acrylate may also be selected from within the structures described in copending U.S. Patent Application Publication No. 2007/012092entitled "Radiation Curable Phase Change Inks Containing Curable Epoxy-Polyamide Composite Gellants", incorporated herein by reference in its entirety.

The polyamide resin component is a co-gellant, and is desirably included particularly for phase change inks that are intended for transfuse printing to an intermediate surface, since the viscoelastic properties in the inks are beneficial for this application. The polyamide co-gellant may increase the elastic nature of the gel state of the ink. That is, the value of the elastic modulus (G') is higher, which is desired when printing onto an intermediate transfer surface. When printing directly to paper, the requirement for higher elastic modulus (G') for the ink is reduced.

Any suitable polyamide materials may be used for the polyamide component of the gellant, and preferred materials are polyether-polyamides with low molecular weights that are preferably in the range of from 1,000 to 5,000 grams per mole, but can also be outside of this range, and have low amine number preferably in the range of from 0 to 10. Commercially available sources of polyamide resin include, for example, the SYLVAGEL® 1000 polyamide resin from Arizona Chemicals, and variants thereof.

The radiation curable phase change ink compositions are comprised of the curable polyamide-epoxy acrylate gellant in an amount from about 1% to about 50% by weight of the ink, more preferably from about 5% to about 40% by weight of the ink, and most preferably from about 7% to about 30% by weight of the ink, although the value can also be outside of this range. The polyamide co-gellant may be used in an amount from about 0.5% to about 15% by weight of the ink, preferably from about 1% to about 10% by weight of the ink, although the value can also be outside of this range.

The polyamide-epoxy acrylate, when used alone, tends to exhibit poor rheology properties for ink jet applications, and also exhibits lesser elastic modulus. It has been found that addition of the co-gellant polyamide to this material, and in particular a polyether polyamide, at a ratio of polyamide-epoxy acrylate to polyamide of from about 5:1 to about 10:1, sufficiently improves the viscosity and elastic modulus characteristics that an ink may be jetted and cured without significant adversities. A most preferred ink containing the gellant of this embodiment is comprised of about 20% by weight of the polyamide-epoxy acrylate and about 3% by weight of the polyamide.

The gellant preferably exhibits a thermally reversible and narrow gel phase transition when formulated into a radiation curable ink composition. For example, at a temperature of 30° C. suitable for transfuse printing, the radiation curable gel ink preferably exhibits gel state viscosities of at least $10^4$ mPa·s. Further, at the preferred range of temperatures at which the material forms the gel state, i.e., at temperatures of from about 30° C. to about 50° C., the ink preferably has an elastic modulus of at least $10^3$ dynes/cm. Such viscoelastic rheology is important for transfuse printing onto an intermediate transfer surface, since the gelled ink droplets are able to transfer the ink from the intermediate transfer surface to an image receiving substrate such as paper. Further, the gel ink does not typically experience any obvious phase-separation (separating into its liquid and solid material components) during the transfuse process by the action of the pressure roll.

The amide groups of the gellant are believed to function as the principal gelating agents in the gellant, since amide groups in general are known to form extensive hydrogen-bonded networks in the presence of other solvents or components that are proton sources, including alcohols, phenols, amines and carboxylic acids.

The radiation curable phase change ink compositions are comprised of the curable gellant in an amount from about 1% to about 50% by weight of the ink, more preferably from about 5% to about 40% by weight of the ink, and most preferably from about 7% to about 30% by weight of the ink, although the value can also be outside of this range. The co-gellant polyamide resin may be used in an amount from about 0.5% to about 10% by weight of the ink, preferably from about 1% to about 5% by weight of the ink, although the value can also be outside of this range.

In embodiments, the composition also includes a reactive diluent. The reactive diluent can function as a solvent to dilute the gellant composition and enable the appropriate rheological properties, such as gellant viscosity and elasticity. Furthermore, the reactive diluent becomes a part of the liquid components integrated within the gellant network structure, such that upon curing of an ink that is comprised of the same reactive diluent, the gellant material will be covalently linked with the cured ink vehicle and will thereby resist phase separation during the printing process. Typical reactive diluents that are suitable for the gellant composition include monomers, oligomers, polymers and/or any combination thereof such as (meth)acrylate esters such as isobornyl (meth)acrylate and lauryl (meth)acrylate, vinyl ethers or vinyl esters, allylic esters or allylic ethers, vinyl or allyl arenes such as styrene and vinyl toluene, and the like. Commercially available sources of preferred reactive diluents that are also used within the ink vehicle composition include, for example, propoxylated neopentyl glycol diacrylate (available from Sartomer Co. Inc. as SR 9003), and glycerol propoxylated triacrylate, and the like. The amount of reactive diluent used in the preparation of the gellant composition is typically in the range of from 0 to about 80 wt % of total solids in the gellant, and most preferably in the range of from 35 to about 70 wt % of total solids in the gellant.

For example, where the organic gellant is cationically curable (e.g., wherein the radiation curable functional groups include epoxy, vinyl ether, allyl, styrene and other vinyl benzene derivatives, or oxetane groups), additional cationically curable monomers, oligomers or polymers may be included in the ink vehicle.

Cationically radiation curable diluents may include, for example, cycloaliphatic epoxide, and preferably one or more polyfunctional cycloaliphatic epoxides. The epoxy groups may be internal or terminal epoxy groups such as those described in WO 02/06371, incorporated herein by reference. Multifunctional vinyl ethers can also be used. Additional examples of cationically curable monomers/oligomers include the following:

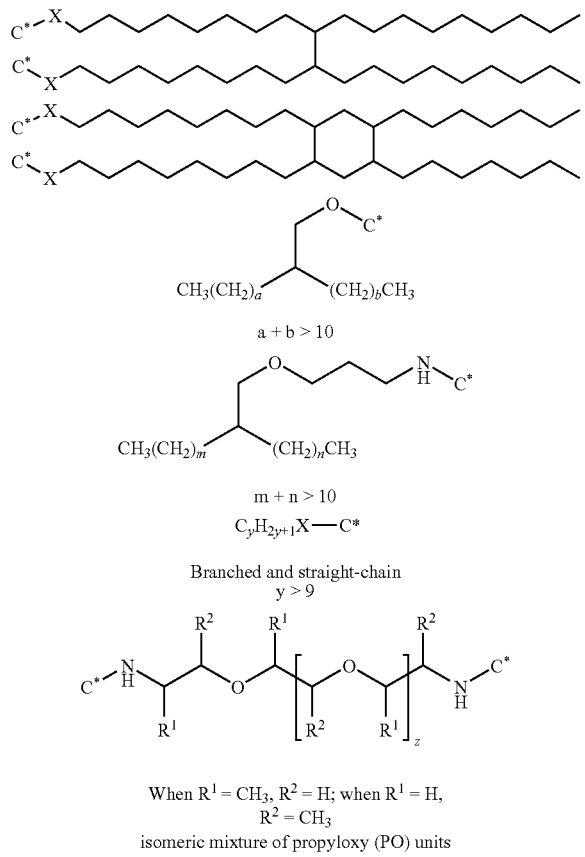

In the foregoing, X may be O or NH, and C* may be

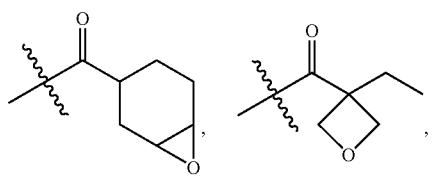

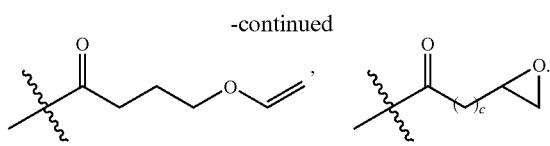

Radically radiation curable diluents, which are preferred given the nature of the polyamide towards radical polymerization, may include, for example, acrylate and methacrylate materials. As relatively non polar monomers, mention may be made of isobornyl (meth)acrylate, lauryl (meth)acrylate, isodecyl(meth)acrylate, isooctyl(meth)acrylate, and butyl acrylate. In addition, multifunctional acrylate monomers/oligomers may be used not only as reactive diluents, but also as materials that can increase the crosslink density of the cured image, thereby enhancing the toughness of the cured images. As multifunctional acrylates and methacrylates, mention may be made of pentaerythritol tetra(meth)acrylate, 1,2 ethylene glycol di(meth)acrylate, 1,6 hexanediol di(meth)acrylate, 1,12-dodecanol di(meth)acrylate, propoxylated neopentyl glycol diacrylate (available from Sartomer Co. Inc. as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation)), trimethylolpropane triacrylate, glycerol propoxylated triacrylate, dipentaerythritol penta-/hexa-acrylate, ethoxylated pentaerythritol tetraacrylate (available from Sartomer Co. Inc. as SR 494), and the like.

The reactive diluent material is preferably added to the ink in amounts of from, for example, 0 to about 80% by weight, preferably about 10% to about 80% by weight, more preferably about 35% to about 70% by weight of the ink.

The ink compositions also contain a colorant. Any desired or effective colorant can be employed in the inks, including dyes, pigments, mixtures thereof, and the like, provided that the colorant can be dissolved or dispersed in the ink vehicle. Pigments are the preferred colorant as they are typically cheaper and more robust than dyes. The color of many dyes can be altered by the polymerization process occurring during the curing stage, presumably from attack of their molecular structure by the free radicals. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include, but are not limited to, Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Particularly preferred are solvent dyes; within the class of solvent dyes, spirit soluble dyes are preferred because of their compatibility with the ink vehicles of the present invention. Examples of suitable spirit solvent dyes include Neozapon Red 492 (BASF); Orasol Red G (Ciba); Direct Brilliant Pink B (Global Colors); Aizen Spilon Red C—BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) are preferred.

Pigments are also suitable colorants for the inks. Examples of suitable pigments include, but are not limited to, Violet PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); Hostaperm Blue B2G-D (Clariant); Permanent Red P—F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF); SUNFAST® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™ (Cabot), Carbon Black 5250, Carbon Black 5750 (Columbia Chemical), mixtures thereof and the like.

The colorant is preferably included in the ink in an amount of from, for example, about 0.1 to about 15% by weight of the ink, preferably about 2.0 to about 8% by weight of the ink.

The colorants may also be used in conjunction with a dispersant to aid dispersion within the ink. Any suitable dispersant may be used.

In a preferred embodiment, the colorants and any dispersants are substantially non-acidic. Acidic colorants such as acidic carbon blacks have a tendency to form irreversible gels. Thus, to avoid this undesirable result, non-acidic colorants and/or dispersants are used.

The radiation curable phase change ink may also include an initiator in embodiments where an initiator is desirable for assisting in curing of the ink. As mentioned above, the initiator may be a thermal initiator and/or a photoinitiator. Suitable thermal initiators include ones that undergo temperature-induced decomposition to form organic radical species, and proceed to cure the ink by free radical polymerization of the components containing ethylenically unsaturated groups. Preferable are thermal initiators that are rated with a ten-hour half-life at high temperatures, for example above 120° C., including organic peroxides such as t-butyl cumyl peroxide, di(t-amyl) peroxide, 2,5-di(t-butylperoxy)-2,5-dimethyl-3-hexyne, cumene hydroperoxide, t-butyl hydroperoxide, and the like.

A photoinitiator that absorbs radiation, for example UV light radiation, to initiate curing of the curable components of the ink may be used. As the photoinitiator for inks that are cured by free radical polymerization, e.g., inks containing acrylate groups or inks comprised of polyamides, mention may be made of photoinitiators such as benzophenones, benzoin ethers, benzil ketals, α-hydroxyalkylphenones, α-aminoalkylphenones and acylphosphine photoinitiators sold under the trade designations of IRGACURE and DAROCUR from Ciba. Specific examples include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenyl-phosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-benzyl 2-dimethylamino 1-(4-morpholinophenyl) butanone-1 (available as Ciba IRGACURE 369); 2-hydroxy-1-(4-(4-(2-hydroxy-2-methylpropionyl)-benzyl)-phenyl)-2-methylpropan-1-one (available as Ciba IRGACURE 127); 2-dimethylamino-2-(4-methylbenzyl)-1-(4-morpholin-4-ylphenyl)-butanone (available as Ciba IRGACURE 379); titanocenes; isopropylthioxanthone; 1-hydroxy-cyclohexylphenylketone; benzophenone; 2,4,6-trimethylbenzophenone; 4-methylbenzophenone; diphenyl-(2,4,6-trimethylbenzoyl) phosphine oxide; 2,4,6-trimethylbenzoylphenylphosphinic acid ethyl ester; oligo(2-hydroxy-2-methyl-1-(4-(1-methylvinyl)phenyl) propanone); 2-hydroxy-2-methyl-1-phenyl-1-propanone; benzyl-dimethylketal; and mixtures thereof. Mention may also be made of amine synergists, i.e., co-initiators that donate a hydrogen atom to a photoinitiator and thereby form a radical species that initiates polymerization (amine synergists can also consume oxygen dissolved in the ink—as oxygen inhibits free radical polymerization its consumption increases the speed of polymerization), for example such as ethyl-4-dimethylaminobenzoate and 2-ethylhexyl-4-dimethylaminobenzoate. This list is not exhaustive, and any known photoinitiator that initiates the free radical reaction upon exposure to a desired wavelength of radiation such as UV light can be used without limitation.

It is preferred that the photoinitiator absorb radiation of about 200 to about 420 nm wavelengths in order to initiate cure, although use of initiators that absorb at longer wavelengths, such as the titanocenes which may absorb up to 560 nm, can also be used without restriction.

The total amount of initiator included in the ink may be from, for example, about 0.5 to about 15%, preferably from about 1 to about 10%, by weight of the ink.

In embodiments, it is preferred to include a bifunctional fatty alcohol as a thermal solvent in an amount of from about 25 to about 35% by weight of the ink. In such embodiments, the use of cationic curing over free radical curing may be advantageous since the fatty alcohols can react during the cationic cure so as to become part of the cured network.

The inks can also optionally contain an antioxidant. The optional antioxidants of the ink compositions protect the images from oxidation and also protect the ink components from oxidation during the heating portion of the ink preparation process. Specific examples of suitable antioxidant stabilizers include NAUGARD™ 524, NAUGARD™ 635, NAUGARD™ A, NAUGARD™ I-403, and NAUGARD™ 959, commercially available from Crompton Corporation, Middlebury, Conn.; IRGANOX™ 1010, and IRGASTAB UV 10, commercially available from Ciba Specialty Chemicals; GENORAD 16 and GENORAD 40 commercially available from Rahn AG, Zurich, Switzerland, and the like. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink.

The inks of embodiments of the invention may further include conventional type additives to take advantage of the known functionality associated with such conventional additives. Such additives may include, for example, defoamers, slip and leveling agents, pigment dispersants, etc.

The inks may be prepared by any suitable technique. As an example, the inks may be prepared by first dissolving the initiator components of the ink into the reactive diluent or curable monomer and optional oligomers mixture, adding the specified amount of radiation curable gellant, preferably less than 50% by weight of the ink, heating the mixture to obtain a single phase with low viscosity and thereafter adding this hot mixture slowly to a heated pigment dispersion (preferably as a concentrate) while agitating the mixture. The ink may then be filtered, preferably at an elevated temperature, through a filter to remove extraneous particles. The method of preparation for the inks may be modified so as to accommodate the type of reactive gelling agents used for the preparation of the inks. For example, a concentrate of the gelling agent may be prepared in one of the components of the ink prior to the addition of the other components. Solutions containing co-gelling agents can also be prepared by a method similar to the one described above. Further examples of ink preparation methods are set forth in the Examples below.

The inks described herein are preferably jetted at temperatures of less than about 110° C, preferably from about 40° C. to about 110° C., most preferably from about 65° C. to about 90° C. The inks are thus ideally suited for use in piezoelectric ink jet devices.

The inks can be employed in an apparatus for direct printing ink jet processes, wherein when droplets of the melted ink are ejected in an imagewise pattern onto a recording substrate, the recording substrate is a final recording substrate. The inks can also be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate.

The inks are suited for jetting onto an intermediate transfer substrate, e.g., an intermediate transfuse drum or belt. In a suitable design, the image may be applied by jetting appropriately colored inks during e.g., four to eighteen rotations (incremental movements) of the intermediate transfuse member with respect to the ink jetting head, i.e., there is a small translation of the printhead with respect to the substrate in between each rotation. This approach simplifies the printhead design, and the small movements ensure good droplet registration. Transfuse, i.e., a transfer and fusing step, is desirable in forming the image as transfuse enables a high quality image to be built up on a rapidly rotating transfer member. This approach simplifies the printhead design, while the small movements of the head ensure good droplet registration. Transfuse typically involves jetting the ink from the ink jet head onto an intermediate member such as a belt or drum, i.e., the transfuse member. This allows the image to be rapidly built onto the transfuse member for subsequent transfer and fusing to an image receiving substrate. Alternatively, the same image build up can be carried out directly on the image substrate, for example paper.

The intermediate transfer member may take any suitable form, although it is preferably a drum or belt. The member surface may be at room temperature, although in embodiments it is preferable to heat the member such that a surface temperature thereof is, for example, within the gel state temperature range for the ink. For example, the surface may be maintained at a temperature of about 25° C. to about 100° C., preferably from about 30° C. to about 70° C., more preferably from about 30° C. to about 50° C. In this way, the jetted ink may be made to rapidly form a gel, which gel is maintained on the surface of the transfer member until transfer to the image receiving substrate. Thus, the ink is preferably heated to a first temperature at which the ink may be jetted, e.g., above the gel transition temperature of the ink, which first temperature may be, for example, from about 40° C. to about 110° C. The second temperature at which the gel forms is less than the first temperature, for example is from about 25° C. to about 100° C., as discussed above.

Once upon the intermediate transfer member surface, the jetted ink may be exposed to radiation to a limited extent so as to effect a limited curing of the ink upon the intermediate member surface. This intermediate curing is not to cure the ink to its full extent, but merely to assist in setting the ink up so that it may be transferred to the image receiving substrate with the appropriate amount of penetration, which requires the ink droplets to have a certain rheology before transfer. For controlling the extent of the curing if an intermediate cure is practiced, reference is made to Co-pending application Ser. No. 11/034,850 entitled "Low Level Cure Transfuse Assist for Printing with Radiation Curable Ink", and Co-pending application Ser. No. 11/005,991 entitled "An Apparatus and Process for Printing Ultraviolet Curable Inks," each incorporated herein by reference. This intermediate curing step is not needed, however, as often the gel state is sufficient to impart the desired rheology to the ink droplets.

Following jetting to the intermediate transfer member and optional intermediate curing thereon, the ink is thereafter transferred to an image receiving substrate. The substrate may be any suitable material such as paper, fabric, a plastic film, etc., although the ink is most preferably used in forming images on paper. Following transfer to the substrate, the ink is then cured by exposing the image on the substrate to radiation. For example, radiation having an appropriate wavelength, mainly the wavelength at which the ink initiator absorbs radiation, may be used. This initiates the curing reaction of the ink. The radiation exposure need not be long, and may occur for example, about 0.05 to about 10 seconds, more preferably from about 0.2 to about 2 seconds. These exposure times are more often expressed as substrate speeds of the ink passing under a UV lamp. For example the microwave energized, doped mercury bulbs available from UV Fusion (Gaithersburg, Md.) are placed in an elliptical mirror assembly that is 10 cm wide; multiple units may be placed in series. Thus a belt speed of 0.1 ms$^{-1}$ would require 1 second for a point of an image to pass under a single unit, while a belt speed 4.0 ms$^{-1}$ would require 0.2 s to pass under four bulb assemblies The radiation to cure the curable components of the ink is preferably provided by a variety of possible techniques, including but not limited to a xenon lamp, laser light, D or H bulb, LED etc. The curing light may be filtered, if desired or necessary. The curable components of the ink react to from a cured or crosslinked network of appropriate hardness. Preferably, the curing is substantially complete to complete, i.e., at least 75% of the curable components are cured (reacted and/or crosslinked). This allows the ink to be substantially hardened, and thereby to be much more scratch resistant, and also adequately controls the amount of showthrough on the substrate.

Inks herein, which include a curable gellant comprised of a curable polyamide-epoxy acrylate component and a polyamide component, exhibit a remarkable ability to transfer from the intermediate transfer surface squeegee-free at low viscosity. That is, little to no ink remains to be removed from the intermediate transfer member surface following transfer to the image receiving substrate.

In another embodiment, the recording substrate onto which droplets of the melted ink are ejected in an imagewise pattern, whether it is the final recording substrate (in a direct printing process) or an intermediate transfer member (in an indirect printing process), is maintained at a temperature at which the ink is in the gel state, i.e., at a temperature between the gel point and the melting point of the ink. Without being limited to any specific theory, it is believed that in this embodiment, the substrate temperature (either the final substrate or the intermediate transfer member) is set at an optimum temperature for the formation of a reinforcing gel network. It is believed that the image thus formed will have improved robustness as a result of the reinforcement of the ink vehicle with the gellant. Upon cooling or, in the case of an indirect printing method, transfer to the final substrate, the gellant network is frozen within the ink vehicle.

When an indirect printing process is used, the intermediate transfer member can be of any desired or suitable configuration, such as a drum or roller, a belt or web, a flat surface or platen, or the like. The intermediate transfer member can be heated by any desired or suitable method, such as by situating heaters in or near the intermediate transfer member, or the like. Optionally, a layer of a sacrificial liquid can be applied to the intermediate transfer member prior to ejecting the droplets of melted ink onto the intermediate transfer member, whereby the melted ink droplets are ejected onto the sacrificial liquid layer on the intermediate transfer member, as disclosed in, for example, U.S. Pat. No. 5,389,958. Transfer from the intermediate transfer member to the final recording substrate can be made by any desired or suitable method, such as by passing the final recording substrate through a nip formed by the intermediate transfer member and a back member, which can be of any desired or effective configuration, such as a drum or roller, a belt or web, a flat surface or platen, or the like. Transfer can be effected at any desired or effective nip pressure, for example from about 5 pounds per square inch to about 2,000 pounds per square inch, preferably from about 10 to about 200 pounds per square inch, although the pressure can be outside of these ranges. Subsequent to transfer, the image on the substrate is cured. The radiation to cure the curable components of the ink is preferably provided by a variety of possible techniques, including but not limited to heat, a xenon lamp, laser light, D or H bulb, LED, UV light sources, etc. Without being limited to any specific theory, it is believed that in this embodiment, the ink is transferred to the final recording substrate in a semi-solid state, facilitating penetration of the ink into the final substrate (paper fibers, for example) and enabling improved adhesion, reduced showthrough, and reduced pile height.

The following example inks further illustrate embodiments of the invention.

EXAMPLES 1 AND 2 AND COMPARATIVE EXAMPLES 1 AND 2

Comparative Examples 1 and 2 were prepared using only a commercial curable polyamide-epoxy acrylate (Cognis PHOTOMER® RM 370). These comparative example materials are directly compared to Examples 1 and 2 where the same commercial polyamide-epoxy acrylate is used along with a polyether polyamide gellant. Example 1 and Comparative Examples 1 and 2 contained no pigment. Example 2 is identical to Example 1 except Example 2 further includes 3% by weight carbon black pigment (Mitsubishi 25), with EFKA 7496 (EFKA Additives), about 0.8 wt %, used as a pigment dispersant. The photoinitiators used were 1 wt % IRGACURE 369 (Ciba), 2 wt % IRGACURE 907 (Ciba) and 0.5 wt % ITX (an isopropyl-9H-thioxanthen-9-one, mixture of 2- and 4-isomers, available from Aldrich). The remainder of the ink volume was SR9003 (Ex. 1:73.5%, Ex. 2:66.7%, Comp. Ex 1:66.5%, Comp. Ex. 2:76.5%). Table 1 summarizes these Examples and Comparative Examples.

TABLE 1

| Ex/Comp Ex | PHOTOMER® RM 370 (wt %) | Polyether Polyamide (wt %) | G' max @ 30° C. | Viscosity @ 30° C. (mPa·s) | Viscosity @ 80° C. (mPa·s) | Ratio (Visc @ 30° C./Visc @ 80° C.) |
|---|---|---|---|---|---|---|
| Ex 1 | 20 | 3 | $4.0 \times 10^3$ | $4.3 \times 10^5$ | 13.3 | $3.2 \times 10^4$ |
| Ex 2 | 20 | 6 | $4.8 \times 10^3$ | $4.8 \times 10^5$ | 11.4 | $4.2 \times 10^4$ |
| Comp Ex 1 | 30 | 0 | $5.1 \times 10^2$ | $5.7 \times 10^4$ | 9.4 | $6.0 \times 10^3$ |
| Comp Ex 2 | 20 | 0 | $3.8 \times 10^2$ | $3.9 \times 10^4$ | 7.0 | $5.6 \times 10^3$ |

While the inks have been described in conjunction with specific embodiments described above, it is evident that many alternatives, modifications and variations will be apparent to those skilled in the art. Accordingly, the preferred embodiments, as set forth above, are intended to be illustrative and not limiting. Various changes may be made without departing from the spirit and scope of the inks described herein.

What is claimed is:

1. A radiation curable phase change ink comprising an ink vehicle that includes curable gellants, the ink comprised of
    a curable polyamide-epoxy acrylate gellant obtained by reacting epoxy groups with an ethylenically unsaturated acid,
    a polyamide co-gellant,
    at least one reactive diluent,
    and optionally at least one colorant, and
    wherein the polyamide-epoxy acrylate gellant is present in an amount of from about 1% to about 50% by weight of the ink and the polyamide co-gellant is present in an amount of from about 0.5% to about 15% by weight of the ink.

2. The radiation curable phase change ink according to claim 1, wherein the phase change ink has a gel transition temperature of from about 25° C. to about 100° C.

3. The radiation curable phase change ink according to claim 1, wherein the ink forms a gel state having a viscosity of at least $10^3$ mPa·s.

4. The radiation curable phase change ink according to claim 1, wherein the polyamide co-gellant comprises a polyether polyamide.

5. The radiation curable phase change ink according to claim 1, wherein the ink has an elastic modulus of at least about $10^3$ dynes/cm$^2$ in the temperature range of 30° C. to 50° C.

6. The radiation curable phase change ink according to claim 1, wherein the ink has a viscosity of from about 3 mPa·s to about 30 mPa·s at temperatures of from about 70° C. to about 90° C.

7. The radiation curable phase change ink according to claim 1, wherein the reactive diluent is comprised of at least one of a curable monomer, a curable oligomer, a curable polymer, or any mixture combination thereof.

8. The radiation curable phase change ink according to claim 7, wherein the reactive diluent is selected from among isobornyl (meth)acrylate, lauryl (meth)acrylate, isodecyl (meth)acrylate, isooctyl(meth)acrylate, butyl acrylate, pentaerytritol tetra(meth)acrylate, 1,2 ethylene glycol di(meth)acrylate, 1,6 hexanediol di(meth)acrylate, 1,12-dodecanol di(meth)acrylate, propoxylated neopentyl glycol diacrylate, hexanediol diacrylate, tripropylene glycol diacrylate, dipropylene glycol diacrylate, amine modified polyether acrylates, trimethyloipropane triacrylate, glycerol propoxylate triacrylate, dipentaerythritol penta-/hexa-acrylate, and ethoxylated pentaerythritol tetraacrylate.

9. The radiation curable phase change ink according to claim 7, wherein the reactive diluent is added to the ink in amounts of from about 10% to about 80% by weight of the ink.

10. The radiation curable phase change ink according to claim 1, wherein the at least one colorant is a dye, a pigment, or a mixture thereof.

11. The radiation curable phase change ink according to claim 1, wherein the at least one colorant is substantially non-acidic, wherein the at least one colorant is dispersed with a dispersant, and wherein the dispersant is substantially non-acidic.

12. The radiation curable phase change ink according to claim 1, wherein the ink further includes at least one initiator comprising a photoinitiator, a thermal initiator, or mixtures thereof.

13. The radiation curable phase change ink of claim 1, further comprising at least one colorant.

14. The radiation curable phase change ink of claim 1, wherein the gellants comprise the polyamide-epoxy acrylate gellant and the polyamide co-gellant at a ratio of from about 5:1 to about 10:1.

15. The radiation curable phase change ink of claim 1, wherein the polyamide co-gellant comprises polyether polyamide and wherein the reactive diluent comprises propoxylated neopentyl glycol diacrylate.

16. A method of forming an image, comprising heating a radiation curable phase change ink to a first temperature, wherein the ink comprises an ink vehicle that includes curable gellants comprised of a curable polyamide-epoxy acrylate gellant obtained by reacting epoxy groups with an ethylenically unsaturated acid, a polyamide co-gellant, at least one reactive diluent, and at least one colorant, wherein the polyamide-epoxy acrylate gellant is present in an amount of from about 1% to about 50% by weight of the ink and the polyamide co-gellant is present in an amount of from about 0.5% to about 15% by weight of the ink, and wherein the viscosity of the ink at the first temperature allows the phase change ink to be jetted;

jetting the heated phase change ink onto an intermediate transfer member surface, wherein the intermediate transfer member surface is maintained at a second temperature, lower than the first temperature, at which the phase change ink forms a gel state;

subsequently transferring the phase change ink from the intermediate transfer member surface to an image receiving substrate; and exposing the phase change ink on the image receiving substrate to radiation energy to cure the curable components of the radiation curable phase change ink.

17. The method according to claim 16, wherein the first temperature is from about 40° C. to about 110° C. and the second temperature is from about 25° C. to about 100° C.

18. The method according to claim 16, wherein the ink forms a gel state upon the intermediate transfer member surface, the ink viscosity in the gel state increasing at least about $10^{2.5}$ times a viscosity of the ink at the first temperature.

19. A method of forming an image, comprising heating a radiation curable phase change ink to a first temperature, wherein the ink comprises an ink vehicle that includes curable gellants comprised of a curable polyamide-epoxy acrylate gellant obtained by reacting epoxy groups with an ethylenically unsaturated acid, a polyamide co-gellant, at least one reactive diluent, and at least one colorant, wherein the polyamide-epoxy acrylate gellant is present in an amount of from about 1% to about 50% by weight of the ink and the polyamide co-gellant is present in an amount of from about 0.5% to about 15% by weight of the ink, and wherein the viscosity of the ink at the first temperature allows the ink to be jetted;

jetting the heated phase change ink onto an image receiving substrate, wherein the image receiving substrate is maintained at a second temperature, lower than the first temperature, at which the phase change ink forms a gel state; and exposing the phase change ink on the image receiving substrate to radiation energy to cure the curable components of the radiation curable phase change ink.

20. The method according to claim 19, wherein the first temperature is from about 40° C. to about 110° C. and the second temperature is from about 25° C. to about 100° C.

* * * * *